United States Patent [19]
Poltielov

[11] Patent Number: 6,148,719
[45] Date of Patent: Nov. 21, 2000

[54] MECHANICAL CORING DEVICE

[76] Inventor: Neris Poltielov, 105-05 69th Ave., apt. 114, Forest Hills, N.Y. 11375

[21] Appl. No.: 09/293,912

[22] Filed: Apr. 19, 1999

[51] Int. Cl.[7] ............................. A23N 4/00; A23N 4/20; A23N 7/00; A23N 7/08
[52] U.S. Cl. ............................. 99/544; 99/542; 99/547; 99/552; 99/559
[58] Field of Search ........................... 99/539, 541–545, 99/547, 549, 550, 552, 559–561, 564, 565, 588, 593; 30/301, 302, 113.1, 113.2, 113.3; 83/588, 613, 621, 932; 426/481–484

[56] References Cited

U.S. PATENT DOCUMENTS

| | | | |
|---|---|---|---|
| 1,006,621 | 10/1911 | Arnold | 99/542 |
| 3,869,974 | 3/1975 | Ellis . | |
| 3,962,963 | 6/1976 | Ellis . | |
| 4,426,924 | 1/1984 | Culwell | 99/545 |
| 4,606,263 | 8/1986 | Ross et al. | 99/542 |
| 4,653,393 | 3/1987 | Ross | 99/542 |
| 5,056,223 | 10/1991 | Buck et al. . | |
| 5,067,397 | 11/1991 | Healy | 99/542 |
| 5,373,781 | 12/1994 | Knasel | 99/542 |
| 5,454,301 | 10/1995 | Rainey et al. | 99/544 |
| 5,463,943 | 11/1995 | Knasel | 99/542 |
| 5,699,725 | 12/1997 | Poltielov . | |

*Primary Examiner*—Timothy Simone
*Attorney, Agent, or Firm*—Michael I. Kroll

[57] ABSTRACT

The present invention discloses a device for mechanically removing the core of fruits and vegetables. The device is designed to be used on a vertical or horizontal hand press. The device has an upper collar member having a centrally located threaded aperture therein for attachment to the hand press and has a connection to a lower collar member upon which the cylindrical coring blade is attached by use of an adjustment screw. The coring blade has a cross member located internally which passes across its inner bore and also an alternative embodiment is disclosed having cutting teeth for cutting into the fruit or vegetable which cutting teeth are located in the cylindrical wall at one distal end of the coring blade.

6 Claims, 9 Drawing Sheets

MECHANICAL CORING DEVICE

BACKGROUND OF THE INVENTION

1. Field of the Invention

The present invention relates generally to food preparation and, more specifically, to a mechanical means for removing the cores of fruits and vegetables or placing a cavity in fruits and vegetables wherein a selection of differing fruits and vegetable can be placed inside for decorative purposes or for cooking.

There are numerous methods for preparing foods for cooking. While these methods may be suitable for the purposes for which they where designed, they would not be as suitable for the purposes of the present invention as heretofore described. It is thus desirable to provide a mechanical means for coring fruits and vegetables which is easy to use, removes hands and fingers from the cutting area and produces a more uniform appearance for use within the food service industry. It is further desirable to provide an apparatus which can be adapted to large scale food service operations, such as institutional cafeterias and kitchens, where it would be necessary to know the amount of filling required per number of fruits or vegetables to be filled.

2. Description of the Prior Art

There are other devices designed for coring fruit and vegetables. Typical of these is U.S. Pat. No. 3,869,974 issued to Ellis on Mar. 11, 1975.

Another patent was issued to Ellis on Jun. 15, 1976 as U.S. Pat. No. 3,962,963 and still another was issued on Oct. 15, 1991 to Buck et al. as U.S. Pat. No. 5,056,223, and, to Poltielov, Applicant, on Dec. 23, 1997 as U.S. Pat. No. 5,699,725.

U.S. Pat. No. 3,869,974

Inventor: Robert G. Ellis

Issued: Mar. 11, 1975

Apples which have been oriented, peeled and cored on the machine shown in U.S. Pat. No. 3,586,081 are further processed to remove the fibrous carpel tissue providing the seed cell in the apple. Following removal of the seed cell, the apples may be discharged whole or passed through a slicing device to cut the apples into a plurality of segments.

U.S. Pat. No. 3,962,963

Inventor: Robert G. Ellis

Issued: Jun. 15, 1976

Apples which have been oriented, peeled and cored on the machine shown in U.S. Pat. No. 3,586,081 are further processed to remove the fibrous carpel tissue providing the seed cell in the apple. Following removal of the seed cell, the apples may be discharged whole or passed through a slicing device to cut the apples into a plurality of segments.

U.S. Pat. No. 5,056,223

Inventor: Helen Buck et al.

Issued: Oct. 15, 1991

A hand tool includes a cutting portion that is attached to a handle by a connecting portion, and is shaped and sized to effectively separate a core from the leaves of a cabbage head and which will efficiently remove such separated core from the leaves.

U.S. Pat. No. 5,699,725

Inventor: Neris Poltielov

Issued: Dec. 23, 1997

A system for preparing baked apples 12 and other edible fruits and vegetables which comprises a component for coring through a top of an apple 16 and into a core 18 thereof to remove the core 18 with its seeds, so as to form a hole 20 therein. A facility 22 is for removing some pulp 24 of the apple 16 from within the hole 20, so as to form an expanded chamber 26 therein with a top inlet port 28. A prepared sweet food mass filler 30 can be inserted past the top inlet port 28 and into the expanded chamber 26, a food topping 32 placed thereon and the apple 16 baked.

While these devices designed for coring fruit and vegetables may be suitable for the purposes for which they were designed, they would not be as suitable for the purposes of the present invention, as hereinafter described.

SUMMARY OF THE PRESENT INVENTION

The present invention relates generally to food preparation and, more specifically, to a mechanical means for removing the cores of fruits and vegetables or placing a cavity in fruits and vegetables wherein a selection of differing fruits and vegetable can be placed inside for decorative purposes or for cooking. The present invention discloses a device for mechanically removing the core of fruits and vegetables. The device is designed to be used on a vertical or horizontal hand press. The device has an upper collar member having a centrally located threaded aperture therein for attachment to the hand press and has means for connection to a lower collar member upon which the cylindrical coring blade is attached by use of an adjustment screw. The coring blade has a cross member located internally which passes across the inner bore and also an alternative embodiment is disclosed having cutting teeth for cutting into the fruit or vegetable which cutting teeth are located in the cylindrical wall at one distal end of the coring blade.

A primary object of the present invention is to provide a coring device which will overcome the shortcomings of prior art devices.

Another object of the present invention is to provide a consistent means of removing a uniform core size from fruits and vegetables.

A still further object of the present invention is to provide the normal cook with the ability to enhance their culinary skills.

A still further object of the present invention is to provide a mechanical means for removing the cores of fruits and vegetables wherein the contact between the food preparer and the food product is limited where health or contamination concerns are an issue.

A yet further object of the present invention is to aid the food preparer by allowing the preparer to concentrate on culinary skills instead of cutlery skills.

Additional objects of the present invention will appear as the description proceeds.

The present invention overcomes the shortcomings of the prior art by providing a mechanical coring device which is easy to use, and is less prone to failure and requires less maintenance over the life of the device.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from tie scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS 10 present invention
12 coring assembly
14 vertical hand press
15 stop member
16 horizontal press
17 base
18 press movement
19 adjustment screw
20 movable shaft
21 U-shaped throat
22 upper movable assembly
23 fruit holder
24 support shaft
26 cutting base
28 fruit or vegetable
30 coring blade housing
32 upper member
34 aperture
36 lower collar
38 adjustment screw
40 aperture
42 means for connection
44 means for attachment
46 coring blade
48 collar
50 shoulder
52 bore
54 cross member
56 inner surface
58 teeth

DESCRIPTION OF THE PREFERRED EMBODIMENT(S)

Figure 1:
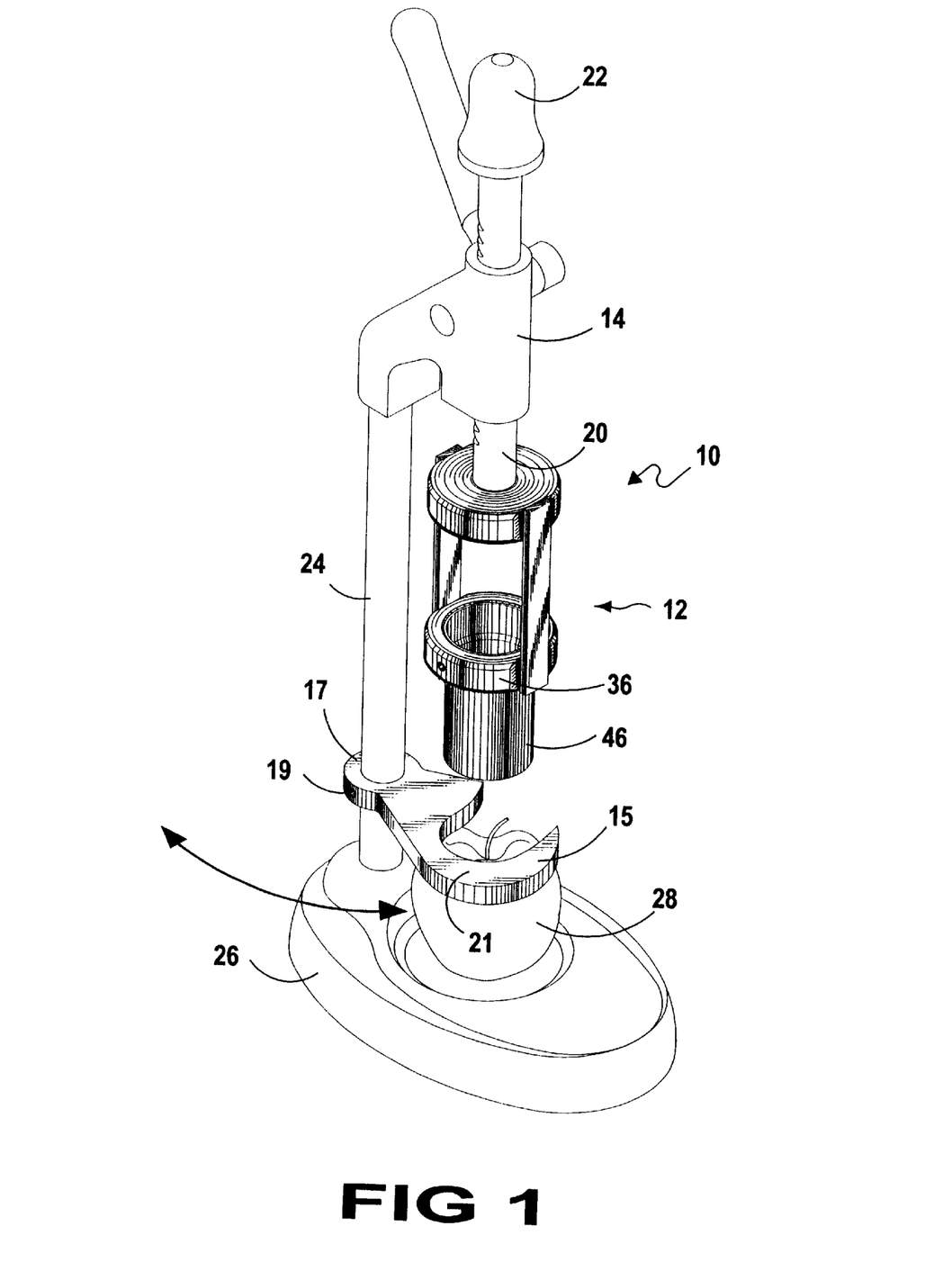
FIG. 1 is a front perspective view of the preferred embodiment of the present invention wherein the coring device has been attached to a vertical hand press.

Turning now descriptively to the drawings, in which similar reference characters denote similar elements throughout the several views, FIGS. 1 through eight illustrate the present invention being a device for removing the course of fruits and vegetables.

Turning to FIG. 1, therein is shown a front perspective view of the preferred embodiment of the present invention 10 wherein the coring device assembly 12 has been attached to a vertical hand press 14 which is generally upstanding. It can be seen that the coring assembly 12 is attached to a vertical reciprocally movable shaft 20 being vertically movable generally having an upper movable assembly 22 connected by an upstanding vertical fixed support shaft 24 having a cutting base 26 upon which the fruit or vegetable 28 is placed. Note that the cutting base 26 also serves as the mounting base for holding the vertical press in a generally upstanding position. Also shown is a vertically adjustable stopping member 15 which attaches to the vertical support shaft 24 by encircling shaft 24 at the base 17 of the member 15 having an adjustment screw 19 mounted in the base 17 and contacting the shaft 24. The stop member has a U-shaped throat 21 which partially encircles the coring blade 46 as the coring assembly 12 is moved toward the fruit 28. A lower collar 36 has a greater diameter than the distance across the U-shaped throat 21 and therefore the collar 36 catches on the U-shaped throat 21 and is thereby stopped at a preselected distance suitable for the particular food item being processed. The stop member 15 can be raised or lowered on the vertical shaft 24 or swung from side to side after the screw 19 is loosened. This vertical press is of the standard type in construction and operation.

In operation the coring blade 46 is moved into position adjacent the food item 28 and pressure is exerted on the handle of the hand press 14 whereby the coring blade 46 enters the soft food item and circularly cuts around the core of the food item. Thereafter the pressure on the hand press is reversed and the coring blade 46 is withdrawn from the food item 28 with the core captured inside the coring blade 46.

Figure 1A:
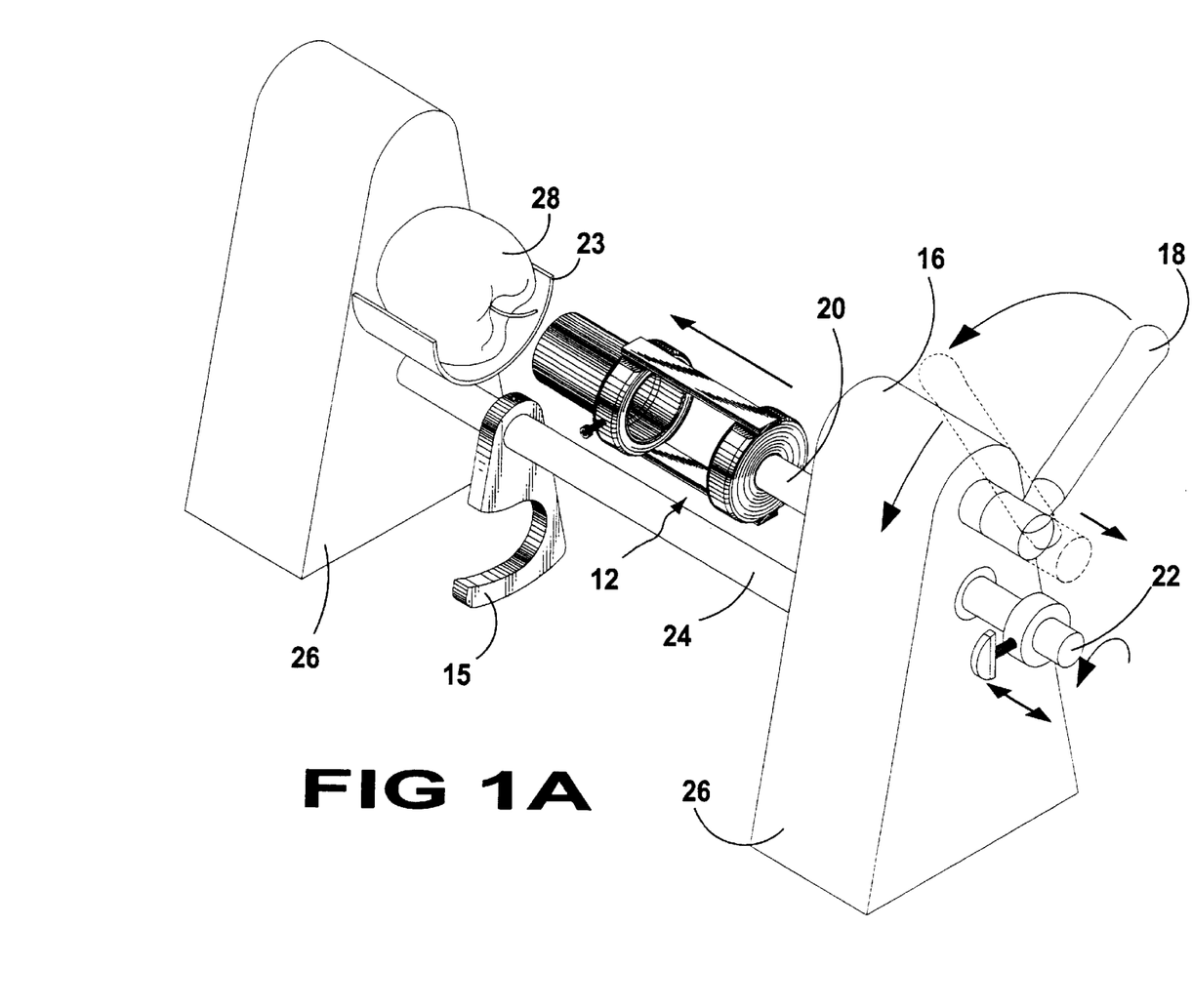
FIG. 1A is a front perspective view of the preferred embodiment of the present invention installed into a device wherein the press movement is in a horizontal direction.

Turning to FIG. 1A, therein is shown a front perspective view of the preferred embodiment of the present invention 10 installed into a horizontal hand press 16 wherein the press movement 18 is operational in the generally horizontal direction. The horizontal press 16 is similar to the vertical press discussed in FIG. 1 having a horizontally movable shaft 20 and a support shaft 24 along with a pair of bases 26 for supporting the press. Stop member 15 is also shown along with a member 23 for holding the fruit 28 so that the coring assembly 12 can access it. This horizontal press is of the standard type in construction and operation.

Figure 2:
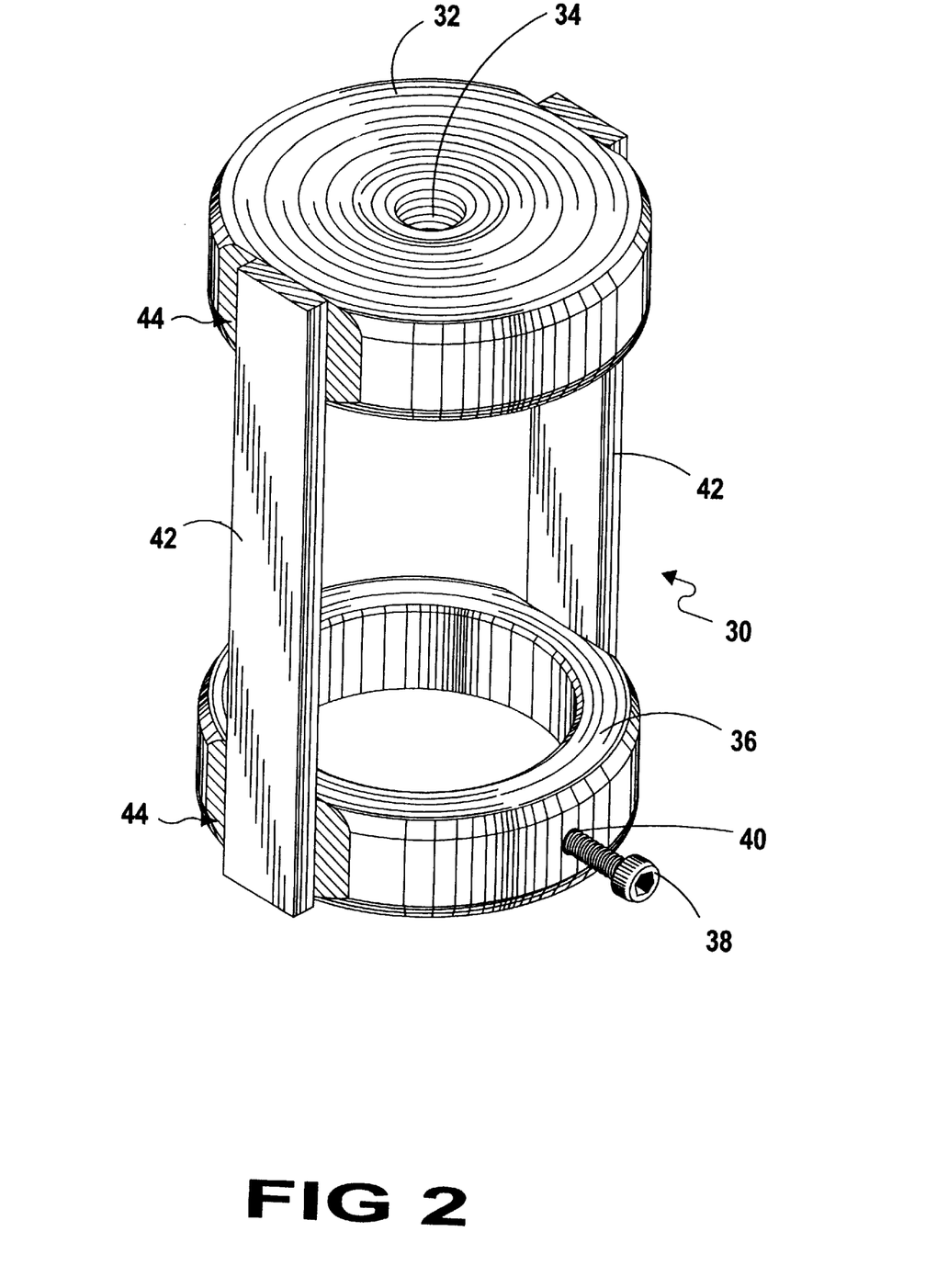
FIG. 2 is a perspective view of the cutter blade housing showing an upper member with a centrally located threaded female opening for attachment to a threaded male member, and a lower blade retaining collar, with an adjustable screw for holding and releasing the coring blade.

Turning to FIG. 2, therein is shown a perspective view of the coring blade housing 30 showing an upper collar or disc member 32 with a centrally located threaded female aperture 34 for attachment to the threaded male member (not shown) of the shaft 20 of the hand press assembly. Also shown is a lower blade retaining collar or disc 36 with an adjustment screw 38 being a threaded screw or like shown in operative connection with the female threaded aperture 40 for releasably contacting and holding the coring blade (not shown). Note that the adjustment screw 38 is horizontally mounted into the aperture 40 into the lower collar 36. Also note that the upper member 32 has means for fixable connection 42 located on opposite sides thereof to the lower collar 36 said means for connection 42 having means for attachment 44, e.g., screws, rivets, welds, or the like, located on opposite sides of the upper member 32 and the lower member 36.

Figure 3:
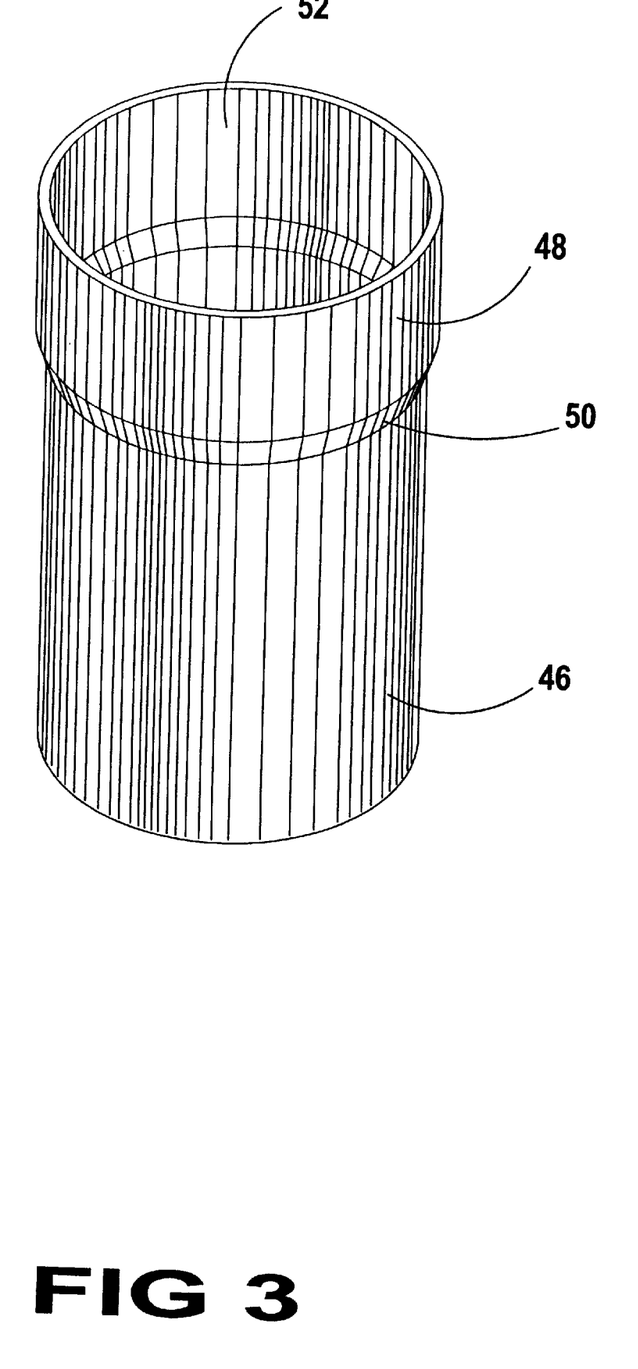
FIG. 3 is a top perspective view of one embodiment of the coring blade which is inserted into the coring blade housing.

Turning to FIG. 3, therein is shown a top perspective view of one embodiment of the coring blade 46 which is designed to be inserted into the coring blade housing 30. Note that the coring blade is a cylindrical hollow tube-like structure having a slightly greater diameter in a collar area 48 wherein the collar area 48 has a shoulder 50 formed at the juncture of the larger diameter of the coring blade and the smaller diameter of the coring blade. Also note that the coring blade 46 has a bore 52 therein.

Figure 4:
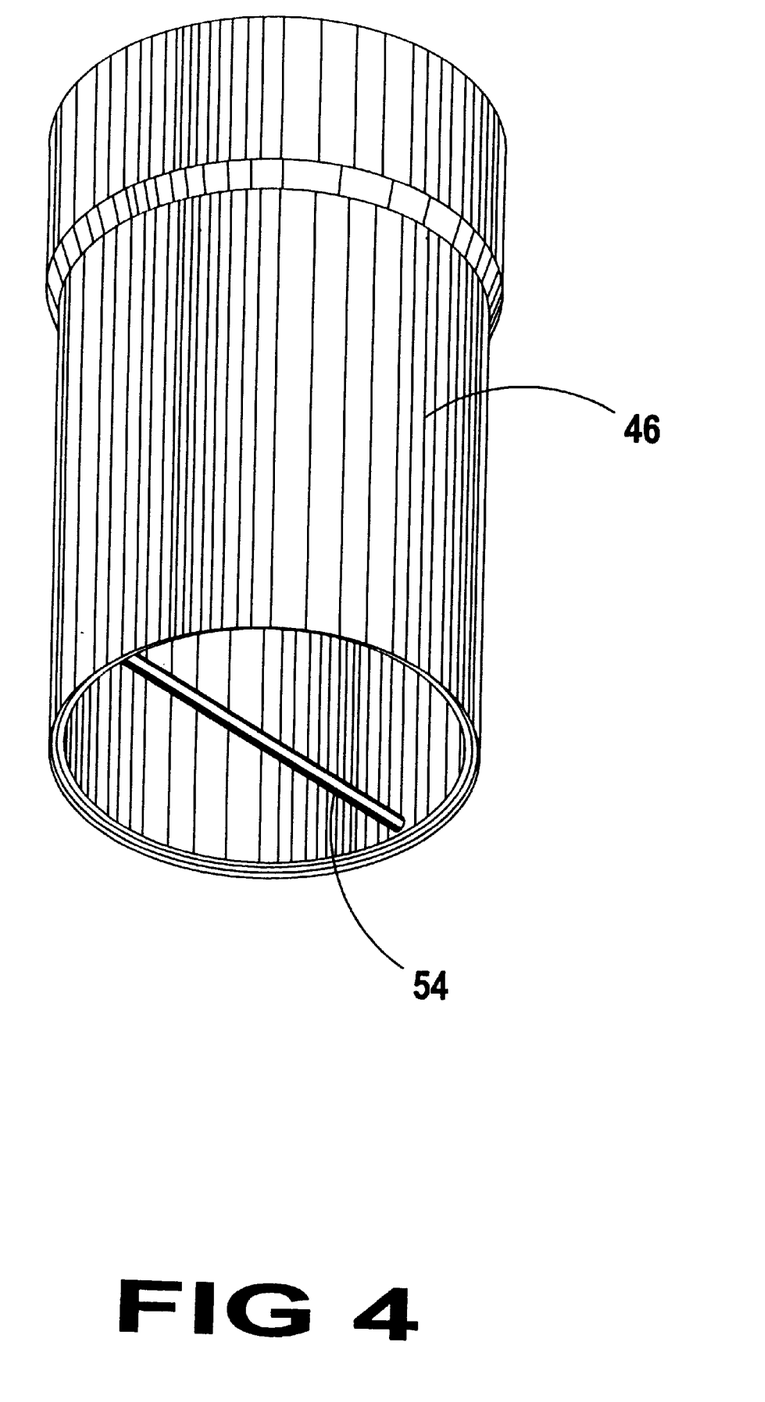
FIG. 4 is a bottom perspective view of the same embodiment of the coring blade, as shown in FIG. 3, showing the internal cross member which will provide a gripping force to the contents of the cylindrical blade while a shearing force, which will remove the core, is being applied to the food item by rotating the food item or the coring mechanism.

Turning to FIG. 4, therein is shown a bottom perspective view of the same embodiment of the coring blade 46 as shown in FIG. 3 above. Shown therein is the internal horizontal cross member 54 located in bore 52 which will provide a gripping force in order to help remove the core of the food item as the coring blade 46 is withdrawn from the food item while also providing a shearing force which will cut and remove the core of the food item with the shearing force being applied to the food item by rotating the food item or the coring blade 46.

Figure 5:
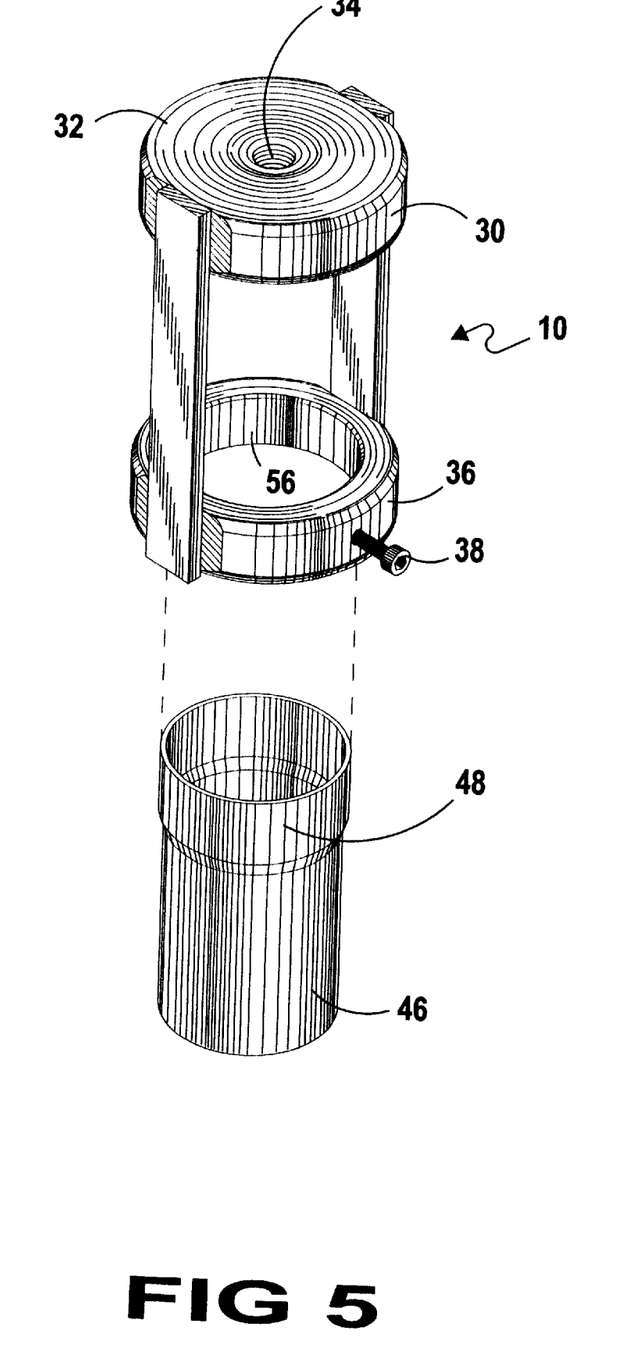
FIG. 5 is a perspective view of the present invention showing the coring blade housing and one embodiment of the coring blade removed from the housing. Also shown is the threaded female receptacle for attachment to a threaded male member which will be used to apply the pressing force needed to core the food product.

Turning to FIG. 5, therein is shown a perspective view of the present invention showing the coring blade housing 30 and one embodiment of the coring blade 46 removed from the housing. Also shown is the threaded female aperture 34 at the top of the upper member 32 for attachment to the threaded male member 20 (not shown) which is used to apply the pressing force needed to core the food product. Note that the collar area 48 of the coring blade has the same diameter as the inner surface 56 of the lower collar member 36 for a tight and secure mating between the two members 36 and 48 thereafter being secured in place by tightening adjustment screw 38 inwardly so that the inner tip of the adjustment screw 38 contacts the collar area 48 of the coring blade 46.

Figure 6:
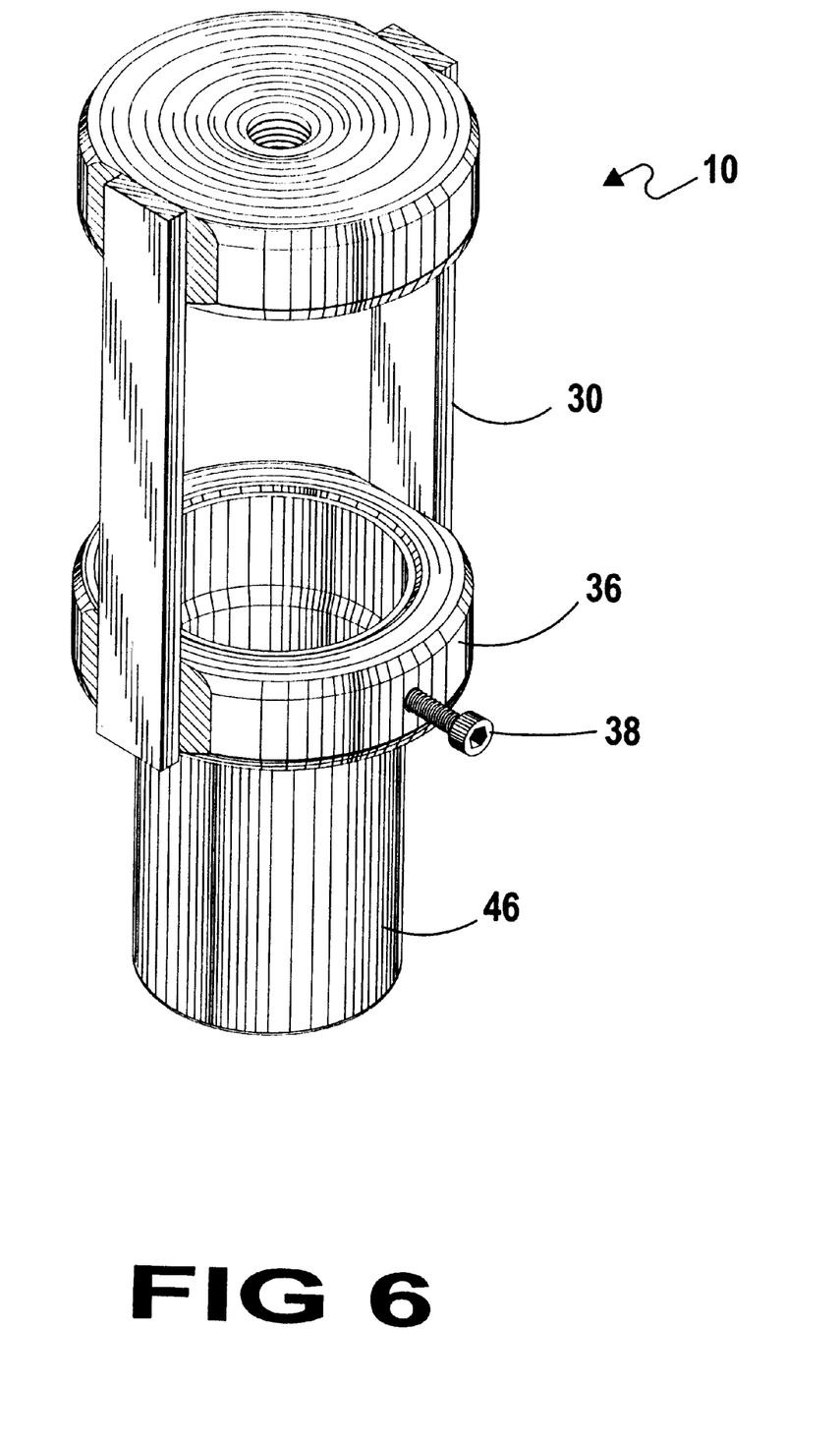
FIG. 6 is a perspective view of the present invention showing the coring blade housing containing the coring blade. Also shown is the threaded female receptacle for attachment to a threaded male member which will be used to apply the pressing force needed to core the food product.

Turning to FIG. 6, therein is shown a perspective view of the present invention 10 showing the coring blade housing 30 containing the coring blade 46. Note that the coring blade 46 is contained within the lower collar 36 having the adjustment screw 38 tightly securing the coring blade 46 to the lower collar member 36 as described in FIG. 5.

Figure 7:
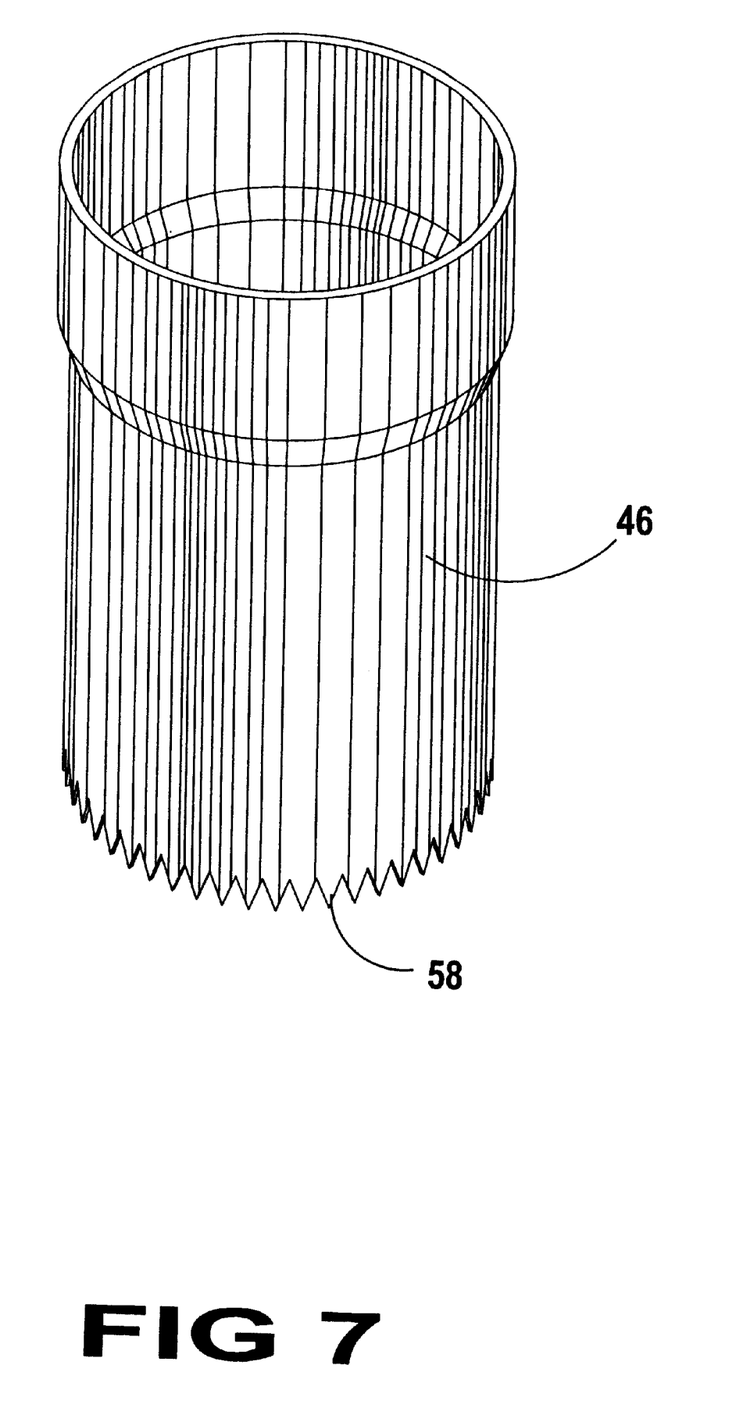
FIG. 7 is a top perspective view of another embodiment of the coring blade which is inserted into the coring blade housing.

Turning to FIG. 7, therein is shown a top perspective view of a another embodiment of the cutting bottom edge of the coring blade 46. Shown on the lower distal end of the coring blade 46 are cutting teeth 58 formed into the cylindrical wall of the coring blade 46 which teeth 58 can be used to cut the fruit or vegetable.

Figure 8:
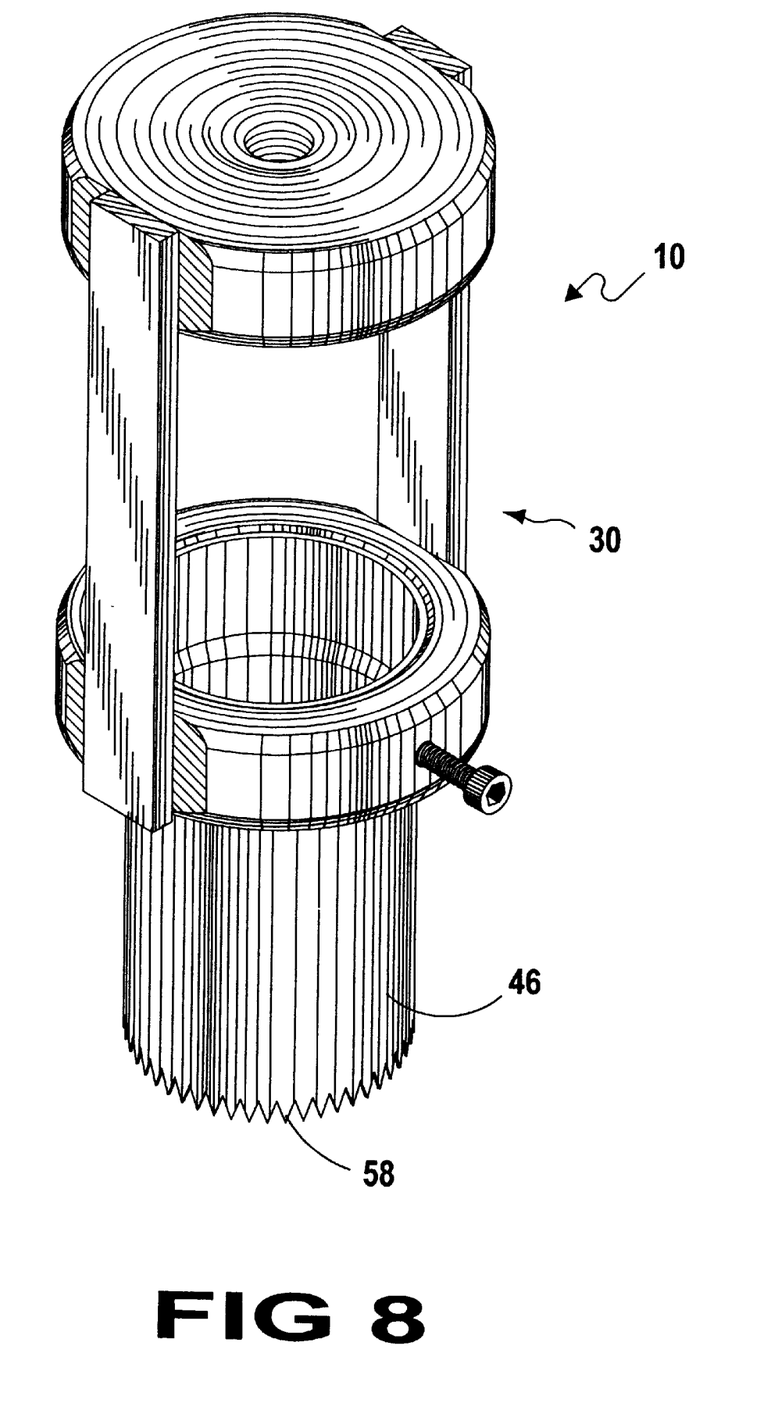
FIG. 8 is a perspective view of the present invention showing the coring blade housing containing the other embodiment of the coring blade. Also shown is the threaded female receptacle for attachment to a threaded male member which will be used to apply the pressing force needed to core the food product.

Turning to FIG. 8, therein is shown a perspective view of the present invention 10 showing the coring blade housing 30 containing the additional embodiment of the coring blade 46 having the cutting teeth 58 formed therein mounting as discussed in FIG. 6.

What is claimed to be new and desired to be protected by Letters Patent is set forth in the claims:

1. An apparatus for coring fruits and vegetables, comprising:

a) a hand press having a support shaft and a mounting base;

b) a reciprocally movable shaft mounted on said hand press;

c) a coring assembly;

d) a coring blade;

e) a first means for attaching said coring blade to said coring assembly;

f) a second means for attaching said coring assembly to said reciprocally movable shaft; and g) said coring blade further comprising a cylindrically shaped tube and an internal cutting member placed horizontally across the bore of said coring blade.

2. The apparatus of claim 1, said coring blade further comprising cutting teeth located on the distal end of the cylindrical wall of said coring blade.

3. An apparatus for coring fruits and vegetables, comprising:

a) a hand press having a support shaft and a mounting base;

b) a reciprocally movable shaft mounted on said hand press;

c) a coring assembly;

d) a coring blade;

e) a first means for attaching said coring blade to said coring assembly; and f) a second means for attaching said coring assembly to said reciprocally movable shaft;

g) said coring assembly further comprising an upper member and a lower member having means for connection to each other; and h) said coring blade further comprising a cylindrically shaped tube, said tube further comprising an enlarged area of said tube, said enlarged area mating to the inner surface of said lower member of said coring assembly.

4. The apparatus of claim 3, further comprising an adjustment screw locate on said lower member of said coring assembly, said screw passing through said lower member and making contact with said tube, whereby said tube is secured to said coring assembly.

5. An apparatus for coring fruits and vegetables, comprising:

a) a hand press having a support shaft and a mounting base;

b) a reciprocally movable shaft mounted on said hand press;

c) a coring assembly;

d) a coring blade;

e) a first means for attaching said coring blade to said coring assembly;

f) a second means for attaching said coring assembly to said reciprocally movable shaft; and g) said second means for attaching further comprising a threaded fastener.

6. An apparatus for coring fruits and vegetables, comprising:

a) a hand press having a support shaft and a mounting base;

b) a reciprocally movable shaft mounted on said hand press;

c) a coring assembly;

d) a coring blade;

e) a first means for attaching said coring blade to said coring assembly;

f) a second means for attaching said coring assembly to said reciprocally movable shaft;

g) said coring assembly further comprising an upper member and a lower member having means for connection to each other; and h) said means for connection comprising a pair of plates, said plates further comprising means for attachment to said upper member and said lower member whereby said upper member and said lower member are fixably attached to each other.

* * * * *